United States Patent
Morita et al.

(10) Patent No.: US 12,320,395 B1
(45) Date of Patent: Jun. 3, 2025

(54) CAM CLUTCH UNIT

(71) Applicant: TSUBAKIMOTO CHAIN CO., Osaka (JP)

(72) Inventors: Akira Morita, Osaka (JP); Hirokazu Tsuneda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/930,191

(22) Filed: Oct. 29, 2024

(30) Foreign Application Priority Data

Dec. 5, 2023 (JP) .................................. 2023-205612

(51) Int. Cl.
*F16D 41/07* (2006.01)
*F16D 41/067* (2006.01)
*F16D 41/06* (2006.01)

(52) U.S. Cl.
CPC ........... *F16D 41/07* (2013.01); *F16D 41/067* (2013.01); *F16D 2041/0603* (2013.01)

(58) Field of Classification Search
CPC . F16D 41/067; F16D 41/07; F16D 2041/0603
See application file for complete search history.

(56) References Cited

U.S. PATENT DOCUMENTS

| 4,880,093 A | * | 11/1989 | Message | F16D 41/07 192/41 A |
| 2003/0010592 A1 | * | 1/2003 | Miura | F16D 41/07 192/45.1 |
| 2023/0228302 A1 | | 7/2023 | Fukuda et al. | |

FOREIGN PATENT DOCUMENTS

| JP | S63001928 U | | 1/1988 |
| JP | 2007092839 A | * | 4/2007 |
| JP | 2007092840 A | * | 4/2007 |
| JP | 2007092841 A | * | 4/2007 |
| JP | 2021177091 A | | 11/2021 |
| JP | 2023104553 A | | 7/2023 |

* cited by examiner

*Primary Examiner* — Lori Wu
(74) *Attorney, Agent, or Firm* — WHDA, LLP

(57) ABSTRACT

An object of the present invention is to provide a cam clutch unit that can improve efficiency of torque transmission by improving ease of assembly and processability, while preventing a cam from falling out of a cage ring and preventing damage to a biasing member during assembly. The object is achieved by a cam by being configured to have a head portion and a leg portion that are configured to have respective maximum cross-sectional widths Wa and Wb larger than an opening width Wp of a pocket portion of a cage ring such that at least one of the head portion and the leg portion of the cam is allowed to pass through the pocket portion by rotating the cam while inserting the cam, which is in an inclined attitude, into the pocket portion along an opening direction thereof and thereby elastically deforming the pocket portion.

6 Claims, 10 Drawing Sheets

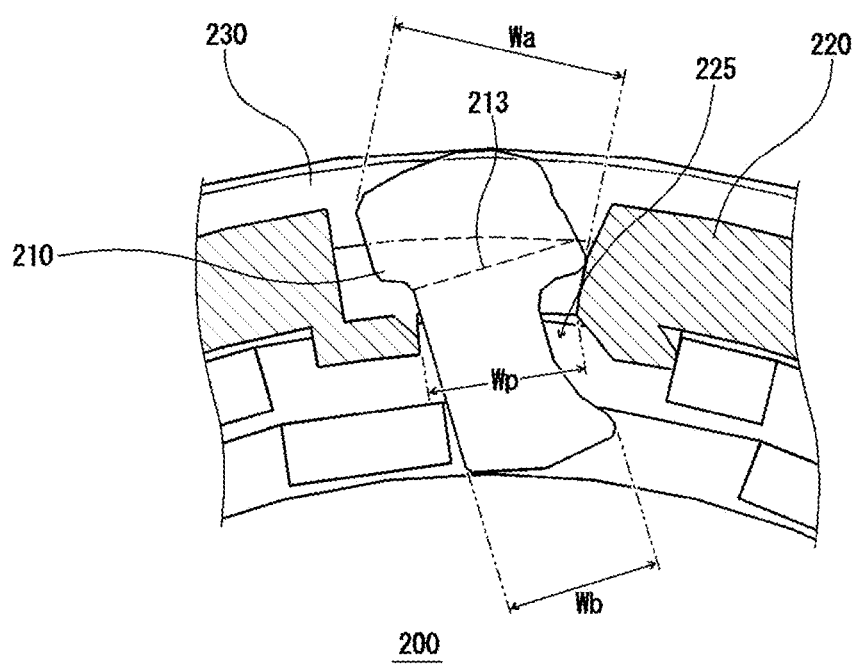
Related Art  Fig.15

CAM CLUTCH UNIT

BACKGROUND OF THE INVENTION

1. Field of the Invention

The present invention relates to a cam clutch unit that transmits and interrupts torque between an input axis and an output axis.

2. Description of the Related Art

As illustrated in, e.g., FIG. 15, a cam clutch unit is known which is configured to include a plurality of cams 210 arranged between an inner race and an out race that are coaxially provided to be capable of relative rotation with respect to each other, a cage ring 220 having a plurality of pocket portions 225 that restrict relative movement of the cams 210 in a circumferential direction, and an annular spring serving as a biasing member 230 mounted in a mounting groove 213 formed in an outer-circumferential-side cam surface of each of the cams 210 to extend in the circumferential direction so as to bias each of the cam 210 and bring each of the cam 210 into contact with the inner race and the outer race (see, e.g., Japanese Patent Application Publication Publication No. 2021-177091).

Each of the cams 210 in the cam clutch unit 200 has a body portion placed in the pocket portion 225 while being inserted therethrough, a head portion continued to an outer circumferential side of the body portion, and a leg portion continued to an inner circumferential side of the body portion. The head portion of the cam 210 is configured such that a maximum cross-sectional width Wa thereof corresponding to a maximum distance between two parallel lines when the head portion is held between the parallel lines is larger than a minimum opening width Wp of the pocket portion 225. Meanwhile, the leg portion of the cam 210 is configured such that a maximum cross-sectional width Wb thereof corresponding to a maximum distance between two parallel lines when the leg portion is held between the parallel lines is smaller than the minimum opening width Wp of the pocket portion 225 so as to allow the cam 210 to pass through the pocket portion 225 by obliquely inserting the cam 210 into the pocket portion 225 from an outer circumferential side.

In the cam clutch unit 200 thus configured, when the cams 210 are to be assembled to the cage ring 220, the cams 210 already inserted and placed in the pocket portions 225 may rotate in the pocket portions 225 and fall out of the cage ring 220. In addition, since the cams 210 need to be obliquely inserted into the pocket portions 225, a problem of reduced assembly workability arises.

Meanwhile, a cam clutch unit is known which uses a so-called snap-fit structure to prevent cams from falling out of pocket portions when the cams are to be assembled to a cage ring (see, e.g., Japanese Utility Model Application Publication No. S63-001928).

Each of cams used in such a cam clutch unit is configured to have a head portion and a leg portion each having a maximum cross-sectional width that is larger than an opening width of each of pocket portions. Accordingly, by inserting the cam into the pocket portion in an opening direction thereof under pressure, the cam is engaged with an edge portion of an opening of the pocket portion, which can prevent the cam from falling out of the pocket portion.

In addition, a structure is also known in which a restricting stepped portion is provided in another end surface of a cam having a biasing-member-engaging stepped portion in one end surface thereof in an axial direction, a restricting protrusion portion that restricts an inclination of the cam is provided on a surface of a pocket portion of a cage ring, with the surface being adjacent to the restricting stepped portion of the cam in the axial direction, and the restricting stepped portion of the cam is engaged with the restricting stepped portion of the pocket portion to prevent the cam from falling out of the cage ring (see Japanese Patent Application Publication No. 2023-104553).

SUMMARY OF THE INVENTION

However, in the configuration described in Japanese Utility Model Application Publication No. S63-001928, due to a structural reason for elastically deforming the cage ring as the can is inserted, high dimensional accuracy is required of the opening width of the pocket portion. However, since the cage ring is formed of, e.g., an integrally molded product made of a resin, it is difficult to form the opening width of the pocket portion with high dimensional accuracy, and the insertion of the cam into the pocket portion under pressure may damage the cage ring.

Meanwhile, the structure described in Japanese Patent Application Publication No. 2023-104553 has the following problem. First of all, during assembly, the cam easily falls apart, and it is necessary to provide an engagement structure for preventing the cam from falling off in the axial direction on one end side of the pocket portion in the axial direction. As a result, when the cam clutch unit is to be inserted between an inner race and an outer race, it may be possible that, with a spring being held between the cam and the cage ring in the axial direction, the spring may be damaged, hence an appropriate biasing force to the cam cannot be obtained. In addition, in terms of a structure in which the restricting stepped portion of the cam and the restricting stepped portion of the pocket portion are to be engaged with each other, it is necessary to provide the cam and the cage ring respectively with the restricting stepped portions, and this increases the number of processing steps and a processing cost burden. Furthermore, since the cam needs to be obliquely inserted into the pocket portion, assembly workability decreases.

The present invention has been made on the basis of circumstances as described above, and an object thereof is to provide a cam clutch unit capable of improving efficiency of torque transmission by improving ease of assembly and processability, while preventing a cam from falling out of a cage ring and preventing damage to a biasing member during assembly.

The present invention solves the problems described above by providing a cam clutch unit including a plurality of cams arranged between an inner race and an outer race that are coaxially provided to be capable of relative rotation with respect to each other, a cage ring made of a resin and having a plurality of pocket portions that restrict relative movement of the cams in a circumferential direction, and a biasing member that biases the cams so as to bring the cams into contact with the inner race and the outer race, each of the cams being configured to have a body portion placed in the pocket portion while being inserted therethrough, and have a head portion continued to an outer circumferential side of the body portion, and moreover have a leg portion continued to an inner circumferential side of the body portion, with a dimension in an axial direction being smaller than a dimension of the pocket portion in the axial direction, each of the head portion and the leg portion being configured such that a maximum cross-sectional width thereof corresponding to a maximum distance between two parallel lines, when each of the head portion and the leg portion is held between the two parallel lines, is larger than an opening width of the pocket portion in a cross section perpendicular to a rotation center of the cam, at least one of the head portion and the leg portion being configured to be allowed to pass through the pocket portion by rotating the cam while inserting the cam, which is in an inclined attitude, into the pocket portion along an opening direction of the pocket portion and thereby elastically deforming the pocket portion.

According to a first aspect of the present invention, the cam and the pocket portion of the cage ring are configured to be snap-fitted with each other by rotating the cam while inserting the cam into the pocket portion during assembly. Therefore, while the cam is inserted into the pocket portion along the opening direction thereof, it is possible to assemble the cam to the cage ring without damaging the cage ring and prevent the cam from falling off.

In addition, since the cam and the pocket portion form a snap-fit structure, there is no need to separately provide the cam and the cage ring with respective structures that prevent the cam from falling off. This can reduce a processing burden. Moreover, it is possible to avoid occurrence of a problem such that, when the cam clutch unit is to be inserted between the inner race and the outer race, the biasing member is held between the cam and the cage ring in the axial direction to be damaged, and accordingly it is possible to allow the biasing member to bias the cam with an appropriate biasing force and improve torque transmissibility. Furthermore, since high dimensional accuracy is not required of the pocket portion, it is possible to improve assembly flexibility.

According to a second aspect of the present invention, when the cam is to be inserted into the pocket portion, an amount (snap amount) of elastic deformation of the pocket portion can be reduced, and therefore the cam can easily be assembled to the cage ring.

According to a third aspect of the present invention, when the cam is to be inserted into the pocket portion, by moving the cam along the cam insertion guide portion, the cam can more easily be assembled to the cage ring, which can improve ease of assembly.

According to a fourth aspect of the present invention, the cam can be inserted in an appropriately inclined attitude into the pocket portion, which can improve ease of assembly.

According to a fifth aspect of the present invention, the spring serving as the biasing member is no longer held between the cam and the cage ring, and consequently the spring is not damaged when the cam clutch unit is inserted between the inner race and the outer race.

According to a sixth aspect of the present invention, the roller pocket portion of the cage ring has the surface adjacent to the roller, with the roller pocket portion being formed into the shape that restricts the movement of the roller toward the outer race side and the inner race side, and therefore it is possible to prevent the roller from falling off toward an outer circumferential side during assembly and improve ease of assembly. In addition, as the roller, a simple columnar or cylindrical roller that requires no processing can be used, which reduces a processing burden.

BRIEF DESCRIPTION OF THE DRAWINGS

FIG. 15 is a cross-sectional view perpendicular to the rotation axis, which illustrates a schematic configuration of an example of a conventional cam clutch unit.

DESCRIPTION OF THE PREFERRED EMBODIMENTS

The following will describe a cam clutch unit according to the present invention on the basis of the drawings.

Figure 1:
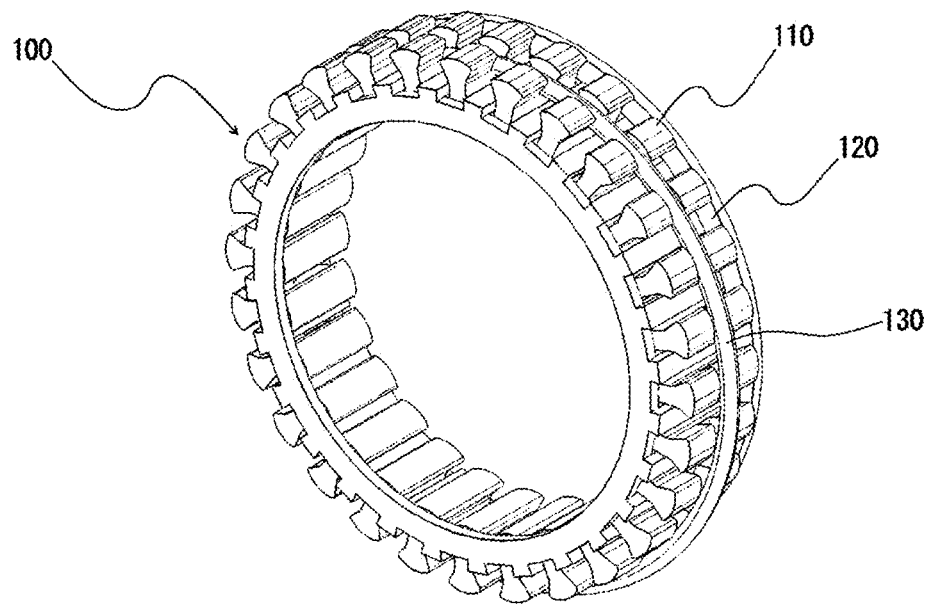
FIG. 1 is a perspective view illustrating a configuration of a cam clutch unit according to a first embodiment of the present invention.

As illustrated in FIG. 1, a cam clutch unit 100 according to a first embodiment of the present invention includes a plurality of cams 110 arranged in an annular space between respective raceway surfaces of an inner race and an outer race that are coaxially provided to be capable of relative rotation with respect to each other, a cage ring 120 having a plurality of pocket portions 125 that restrict relative movement of the cams 110 in a circumferential direction, and a biasing member 130 that biases each of the plurality of cams 110 in a direction of engagement with the inner race and the outer race so as to bring the cam 110 into contact with the inner race and the outer race.

Figure 2:
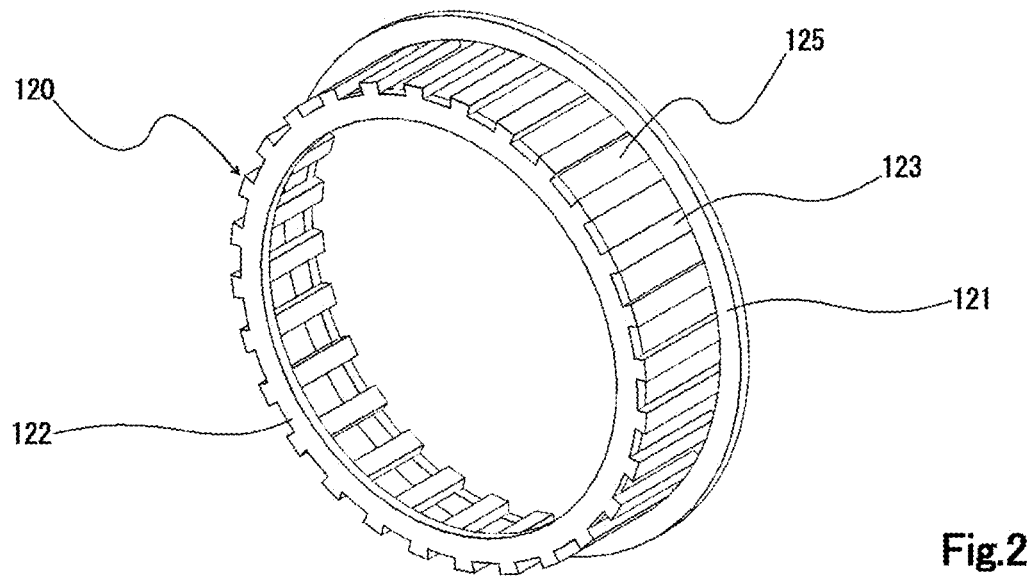
FIG. 2 is a perspective view illustrating a configuration of a cage ring in the cam clutch unit illustrated in FIG. 1.

First, a specific description will be given of a configuration of the cage ring 120. As illustrated in FIG. 2, the cage ring 120 includes a one-end-side annular plate 121 and an another-end-side annular plate 122 that are arranged to be opposed to each other in an axial direction and a plurality of columnar ribs 123 connecting the one-end-side annular plate 121 and the another-end-side annular plate 122. An inner diameter of the one-end-side annular plate 121 is larger than an outer diameter of the another-end-side annular plate 122, each of the ribs 123 has one end portion in the axial direction which is fixed onto an inner circumferential surface of the one-end-side annular plate 121 and another end portion in the axial direction which is fixed onto an outer circumferential surface of the another-end-side annular plate 122, and the one-end-side annular plate 121 forms a radially outwardly protruding flange portion around an entire circumference in the circumferential direction.

The individual ribs 123 are arranged to be equidistantly aligned in the circumferential direction and, between the adjacent ribs 123, the pocket portions 125 are formed.

Figure 3:
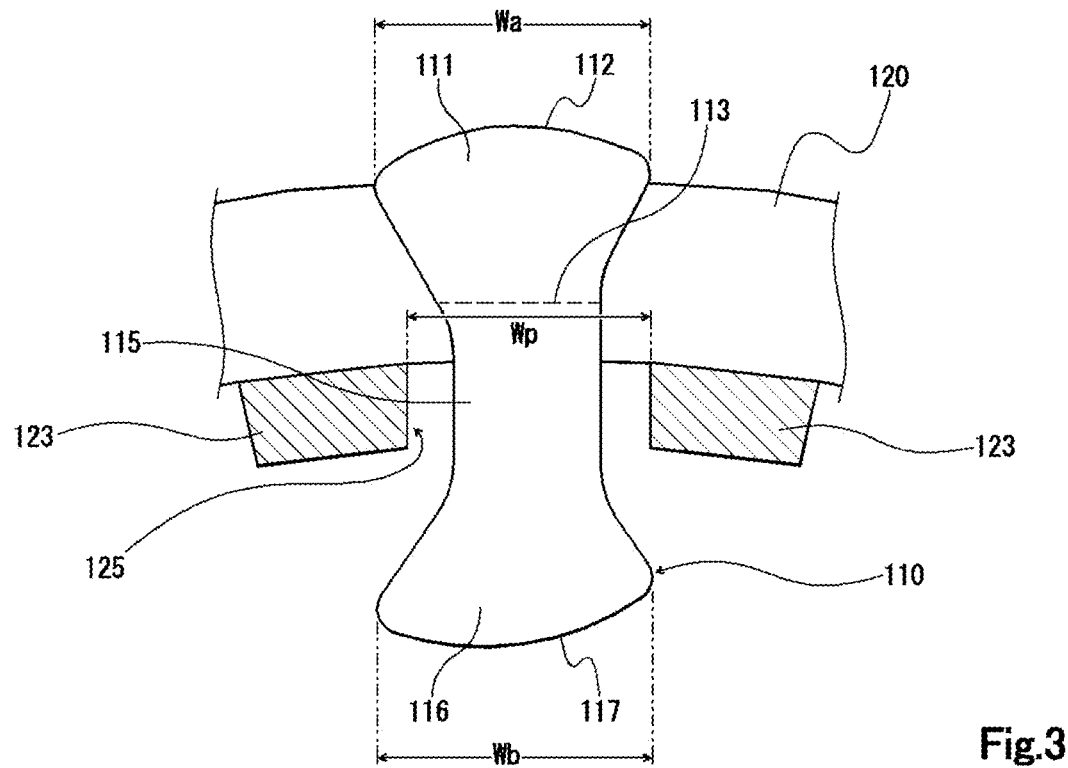
FIG. 3 is an end surface view illustrating a configuration of each of cams in the cam clutch unit illustrated in FIG. 1.

In the present embodiment, as illustrated in FIG. 3, each of the ribs 123 is configured to have a substantially trapezoidal cross-sectional shape such that a width dimension thereof decreases radially inwardly, while each of the pocket portions 125 is configured to have a rectangular opening shape and have an opening width Wp which is uniform in a radial direction.

As illustrated in FIG. 3, each of the plurality of cams 110 has a body portion 115 disposed in the pocket portion 125 of the cage ring 120 while being inserted therethrough, a head portion 111 continued to an outer circumferential side of the body portion 115, and a leg portion 116 continued to an inner circumferential side of the body portion 115. It is to be noted herein that, in a state where the cam 110 is disposed between the inner race and the outer race, the head portion 111 refers to a portion of the cam 110 that protrudes to the outer circumferential side from an opening edge of the pocket portion 125, while the leg portion 115 refers to a portion of the cam 110 that protrudes on the outer circumferential side from the opening edge of the pocket portion 125. In the present embodiment, the body portion 115 is configured to have a columnar form having a uniform width dimension in the radial direction, but may also be configured to have a form having the width dimension which varies in the radial direction.

The head portion 111 of the cam 110 is configured to have an outer-circumferential-side cam surface 112 to be engaged with the raceway surface of the outer race such that a maximum cross-sectional width Wa thereof corresponding to a maximum distance between two parallel lines when the head portion 111 is held between the parallel two lines is larger than the opening width Wp of the pocket portion 125 in a cross section perpendicular to a rotation center of the cam 110.

Figure 4A:
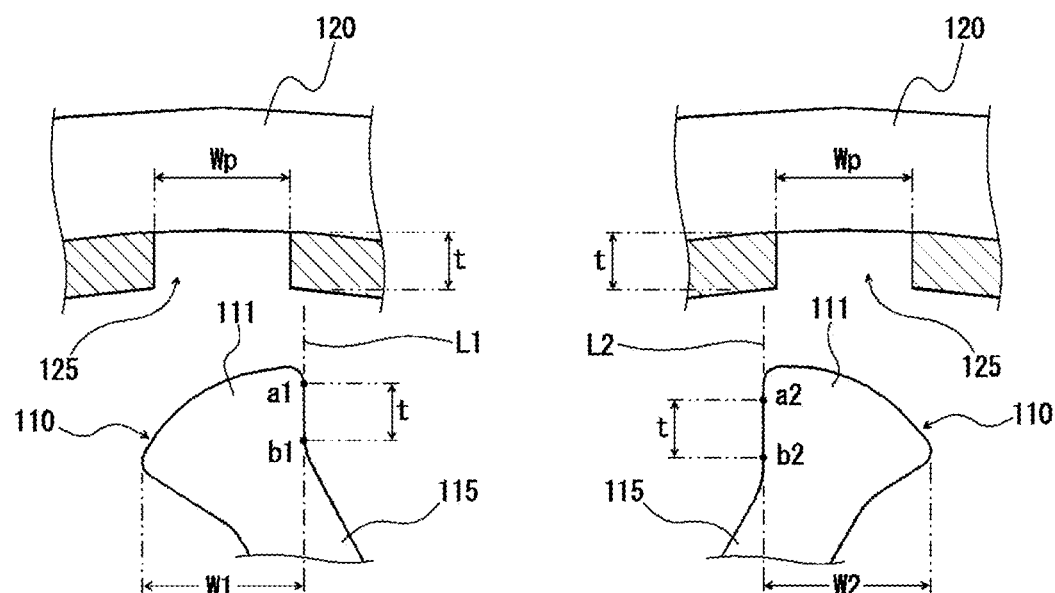
FIG. 4A is a diagram illustrating a configuration of a head portion of the cam.

In addition, in the present embodiment, as illustrated in FIG. 4A, the head portion 111 of the cam 110 is configured such that each of a first-inclination-direction width W1 thereof and a second-inclination-direction width W2 thereof is larger than the opening width Wp of the pocket portion 125. The first-inclination-direction width W1 mentioned herein refers to a width corresponding to a minimum distance between two straight lines, which are a first virtual straight line L1 connecting any two points a1 and b1, the closest distance between which, in a head-portion-side region extending from the head portion 111 to the body portion 115 over one side surface of the cam 110, has the same dimension as that of a thickness t of the pocket portion 125 and a straight line parallel to the first virtual straight line L1, when another side portion of the head portion 111 is held between the two straight lines. Meanwhile, the second-inclination-direction width W2 refers to a width corresponding to a minimum distance between two straight lines, which are a second virtual straight line L2 connecting any two points a2 and b2, the closest distance between which, in a head-portion-side region extending from the head portion 111 to the body portion 115 over another side surface of the cam 110, has the same dimension as that of the thickness t of the pocket portion 125 and a straight line parallel to the second virtual straight line L2, when one side portion of the head portion 111 is held between the two straight lines.

As illustrated in FIG. 3, the leg portion 116 of the cam 110 has an inner-circumferential-side cam surface 117 to be engaged with the raceway surface of the inner race and is configured such that a maximum cross-sectional width Wb thereof corresponding to a maximum distance between two parallel lines when the leg portion 116 is held between the two parallel lines is larger than the opening width Wp of the pocket portion 125 in a cross section perpendicular to the rotation center of the cam 110.

Figure 4B:
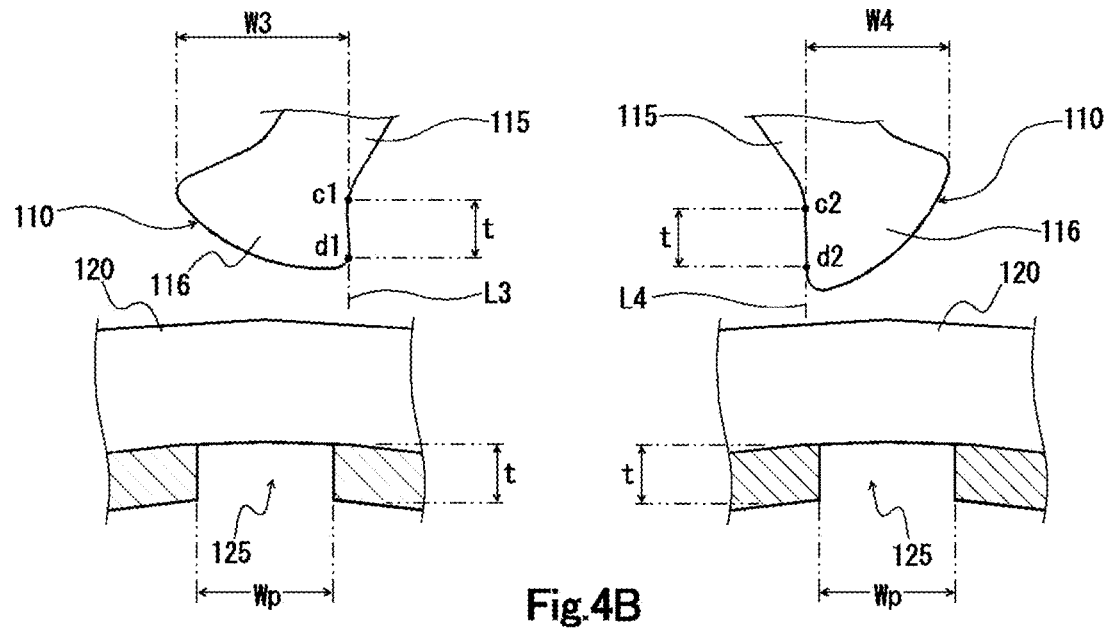
FIG. 4B is a diagram illustrating a configuration of a leg portion of the cam.

Moreover, in the present embodiment, as illustrated in FIG. 4B, the leg portion 116 of the cam 110 is configured such that each of a third-inclination-direction width W3 thereof and a fourth-inclination-direction width W4 thereof is larger than the opening width Wp of the pocket portion 125. It is to be noted herein that the third-inclination-direction width W3 refers to a width corresponding to a minimum distance between two straight lines, which are a third virtual straight line L3 connecting any two points c1 and d1, the closest distance between which, in a leg-portion-side region extending from the body portion 115 to the leg portion 116 over the one side surface of the cam 110, has the same dimension as that of the thickness t of the pocket portion 125 and a straight line parallel to the third virtual straight line L3, when another side portion of the leg portion 116 is held between the two straight lines. Meanwhile, the fourth-inclination-direction width W4 is a width corresponding to a minimum distance between two straight lines, which are a fourth virtual straight line L4 connecting any two points c2 and d2, the closest distance between which, in a leg-portion-side region extending from the body portion 115 to the leg portion 116 over the other side surface of the cam 110, has the same dimension as that of the thickness t of the pocket portion 125 and a straight line parallel to the fourth virtual straight line L4, when one side portion of the leg portion 116 is held between the two straight lines.

In the present embodiment, each of the cams 110 is configured to have both end surfaces thereof in the axial direction which are flat-shaped and have a dimension in the axial direction that is smaller than a dimension of each of the pocket portions 125 in the axial direction. Consequently, during assembly, the cam 110 can approach the pocket portion 125, while being in an attitude in which the both end surfaces thereof extend in an opening direction (radial direction) of the pocket portion 125 without being inclined with respect to the axial direction.

Figure 5:
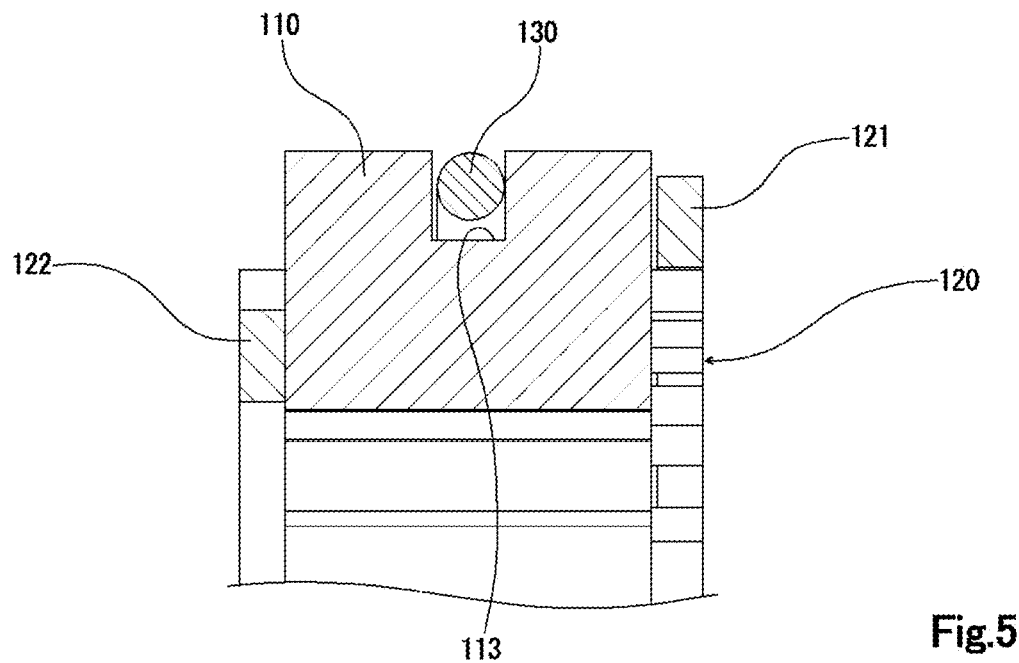
FIG. 5 is a partial cross-sectional view along a rotation axis, which schematically illustrates the configuration of the cam clutch unit illustrated in FIG. 1.

In a state where the cam 110 is placed in the pocket portion 125, a position of the cam 110 in the circumferential direction is restricted by the rib 123 and, as illustrated in FIG. 5, a position of the cam 110 in the axial direction is restricted by the one-end-side annular plate 121 and the another-end-side annular plate 122.

In the present embodiment, the biasing member 130 is formed of an annular spring, and is mounted in a mounting groove 113 formed in the head portion 111 of each of the cams 110.

The mounting groove 113 is formed at a center portion in the axial direction and, as a result of the mounting of the biasing member 130, one side portion of the mounting groove 113 is pressed toward the inner circumferential side and, consequently, the cam 110 is rotated in an engagement direction (e.g., a clockwise direction in FIG. 3) to be biased into a state where the cam 110 is in contact with the inner race and the outer race.

As described above, in the present embodiment, the head portion 111 and the leg portion 116 of the cam 110 are configured such that each of the first-inclination-direction width W1, the second-inclination-direction width W2, the third-inclination-direction width W3, and the fourth-inclination-direction width W4 is larger than the opening width Wp of the pocket portion 125. As a result, even when the cam 110 is in any attitude, each of the head portion 111 and the leg portion 116 of the cam 110 is configured not to be able to pass through the pocket portion 125 by mere insertion of the cam 110 into the pocket portion 125 along the opening direction (radial direction) thereof or by mere movement of the cam 110 placed in the pocket portion 125 in the radial direction during assembly.

Therefore, in the cam clutch unit 100 according to the present embodiment, each of the first-inclination-direction width W1, the second-inclination-direction width W2, the third-inclination-direction width W3, and the fourth-inclination-direction width W4 is provided with a dimension that allows the pocket portion 125 to be elastically deformed by rotating the cam 110 while inserting the cam 110 in an inclined attitude into the pocket portion 125 along the opening direction of the pocket portion 125. In other words, each of the head portion 111 and the leg portion 116 of the cam 110 and the pocket portion 125 form a snap-fit structure and, accordingly, even when the cam 110 is inserted into the pocket portion 125 from either the head portion 111 side or the leg portion 116 side thereof, it is possible to assemble the cam 110 to the cage ring 120 and, even when the cam 110 rotates in the pocket portion 125 into any attitude, it is possible to prevent the cam 110 from falling off.

Note that, as long as at least one of the first-inclination-direction width W1, the second-inclination-direction width W2, the third-inclination-direction width W3, and the fourth-inclination-direction width W4 is provided with a dimension that allows the pocket portion 125 to be elastically deformed by rotating the cam 110 while inserting the cam 110 in the inclined attitude into the pocket portion 125 along the opening direction thereof, it is possible to assemble the cam 110 to the cage ring 120 and, even when the cam 110 rotates in the pocket portion 125 into any attitude, it is possible to prevent the cam 110 from falling off.

Figure 6A:
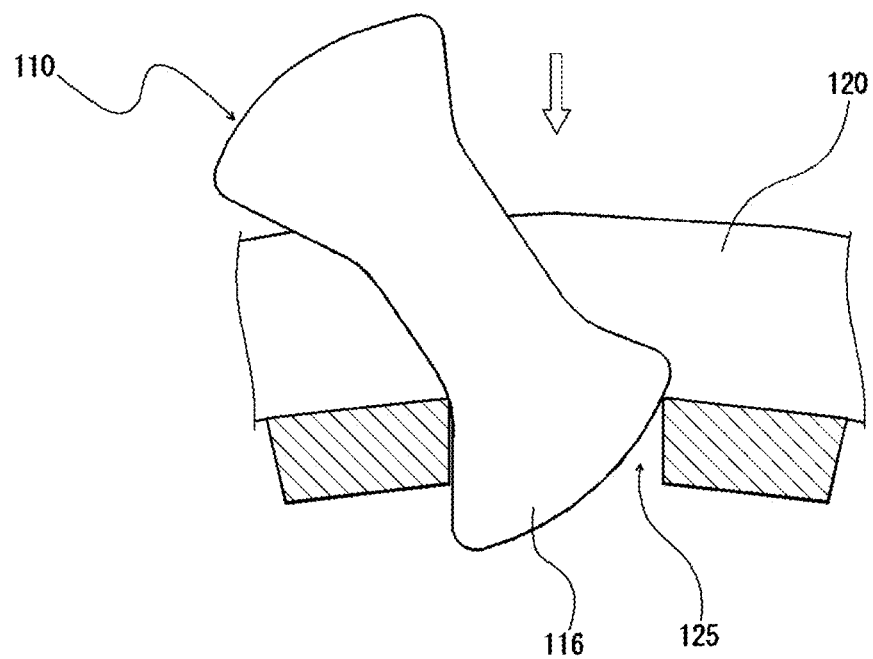
FIG. 6A is a schematic diagram schematically illustrating a step of assembling the cam to the cage ring, which illustrates a state where the cam is being inserted into a pocket portion.
Figure 6B:
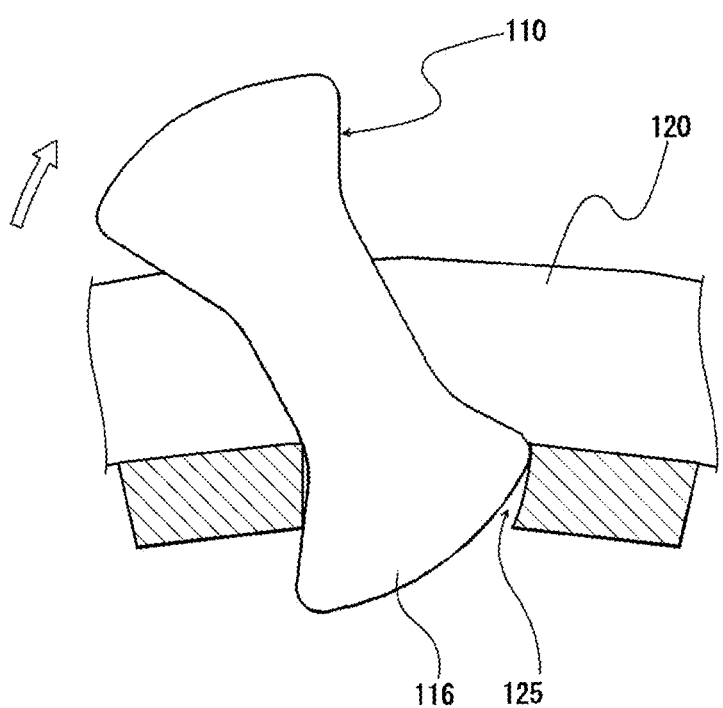
FIG. 6B is a schematic diagram schematically illustrating a step of assembling the cam to the cage ring, which illustrates a state where the cam having the leg portion partially inserted in the pocket portion is rotated.
Figure 6C:
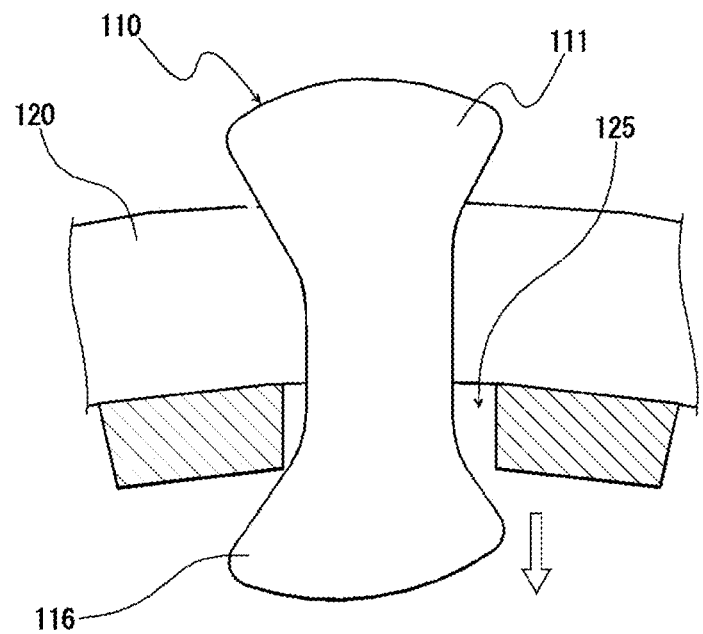
FIG. 6C is a schematic diagram schematically illustrating a step of assembling the cam to the cage ring, which is a diagram illustrating a state where the leg portion of the cam has passed through the pocket portion.

A specific description will be given of an example of a method of assembling the cam 110 to the cage ring 120. As illustrated in FIG. 6A, the cam 110 in the inclined attitude obtained by rotating the cam 110 in a disengagement direction is inserted into the pocket portion 125 from the leg portion 116 thereof along the opening direction of the pocket portion 125. At this time, the fourth-inclination-direction width W4 of the cam 110 is larger than the opening width Wp of the pocket portion 125, and accordingly the leg portion 116 of the cam 110 does not pass through the pocket portion 125 to be brought into a state engaged with the opening edge of the pocket portion 125. In this state, as illustrated in FIG. 6B, the cam 110 is rotated in the engagement direction by using a contact point between another side surface of the body portion 115 of the cam 110 and the opening edge of the pocket portion 125 as a fulcrum to elastically deform the pocket portion 125 and provide a state where the cam 110 can pass through the pocket portion 125. Then, as illustrated in FIG. 6C, by further inserting the cam 110, it is possible to assemble the cam 110 to the cage ring 120. In a state where the cam 110 is placed in the pocket portion 125, each of the first-inclination-direction width W1, the second-inclination-direction width W2, the third-inclination-direction width W3, and the fourth-inclination-direction width W4 of the cam 110 is larger than the opening width Wp of the pocket portion 125 and therefore, even though the cam 110 is rotated in the pocket portion 125 into any attitude when another cam 110 is to be assembled to the cage ring 120, the cam 110 is kept from falling out of the pocket portion 125.

While the description has been given heretofore of the case where, into the pocket portion 125, the cam in the inclined attitude obtained by rotating the cam 110 in the disengagement direction is inserted from the leg portion 116 side thereof, the cam 110 may also be inserted into the pocket portion 125 from the head portion 111 side of the cam 110. Alternatively, it may also be possible to insert the cam 110 in the inclined attitude obtained by rotating the cam 110 in the engagement direction into the pocket portion 125 from the head portion 111 side thereof or the leg portion 116 side thereof.

Thus, in the cam clutch unit 100 according to the present embodiment, the cam 110 and the pocket portion 125 of the cage ring 120 are configured to be snap-fitted with each other by rotating the cam 110 while inserting the cam 110 into the pocket portion 125 during assembly. Accordingly, in the cam clutch unit 100 according to the present embodiment, while the cam 110 is inserted into the pocket portion 125 along the opening direction thereof, it is possible to easily assemble the cam 110 to the cage ring 120 without damaging the cage ring 120 and prevent the cam 110 from falling off.

In addition, since the cam 110 and the pocket portion 125 form the snap-fit structure, there is no need to separately provide the cam 110 and the cage ring 120 with respective structures that prevent the cam 110 from falling off. Therefore, it is possible to reduce a processing burden.

Furthermore, the biasing member 130 is mounted in the mounting groove 113 provided at a center portion of the cam 110 in the axial direction, and accordingly it is possible to avoid occurrence of a problem such that, when the can clutch unit 100 is to be inserted between the inner race and the outer race, the biasing member 130 is held between the cam 110 and the cage ring 120 in the axial direction to be damaged. As a result, it is possible to use the biasing member 130 to apply an appropriate biasing force to the cam 110 and bias the cam 110 and improve torque transmissivity. In addition, since high dimensional accuracy is not required of the pocket portion 125, assembly flexibility can be improved.

The cage ring 120 may also be configured to have a cam insertion guide portion on at least one side of the opening edge of the pocket portion 125 in the circumferential direction. With such a configuration, when the cam 110 is to be inserted into the pocket portion 125, by moving the cam 110 along the cam insertion guide portion, the cam 110 is more easily assembled to the cage ring 120, which can improve the ease of assembly.

Figure 7:
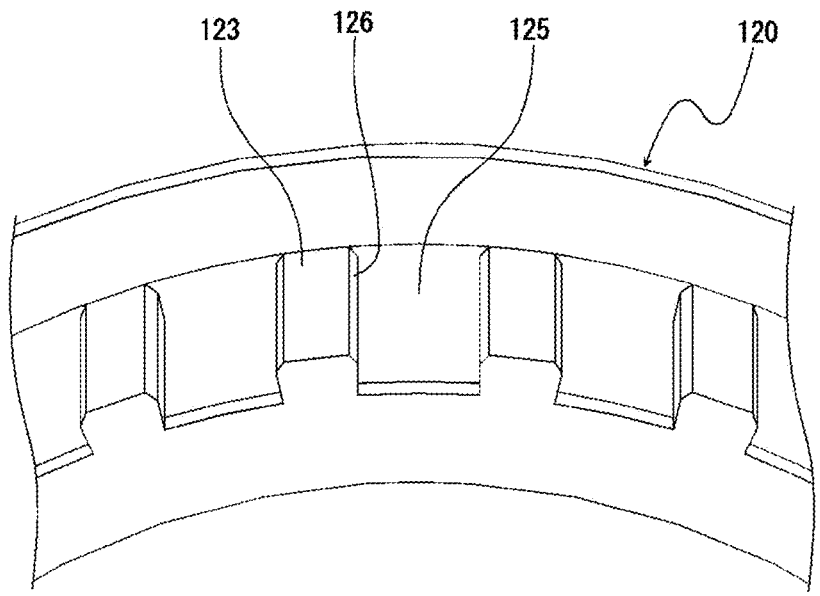
FIG. 7 is a perspective view illustrating a portion of a configuration of the cage ring in another example.

Specifically, when, e.g., the cam 110 is to be assembled to the pocket portion 125 from the leg portion 116 side thereof, by providing each of both side edges of an outer surface of the rib 123 with a C-chamfered shape as illustrated in FIG. 7, a cam insertion guide portion 126 is configured. It may also be possible that only one side edge of the outer surface of the rib 123 is configured to have the C-chamfered shape or, alternatively, the side edge of the outer surface of the rib 123 has an R-chamfered shape, not the C-chamfered shape.

When the cam 110 is to be assembled to the pocket portion 125 from the head portion 111 side thereof, the cam insertion guide portion may be provided appropriately on at least one of side edges of an inner surface of the rib 123.

The cage ring 120 may also be configured to have, at an opening edge portion of the pocket portion 125, a cam-insertion-attitude stabilizing portion which comes into contact with one side surface or another side surface of the body portion 115 when the cam 110 is placed in an inclined attitude upon insertion of the cam 110 into the pocket portion 125. Such a configuration allows the cam 110 to be inserted in an appropriately inclined attitude into the pocket portion 125 and can improve the ease of assembly.

Figure 8:
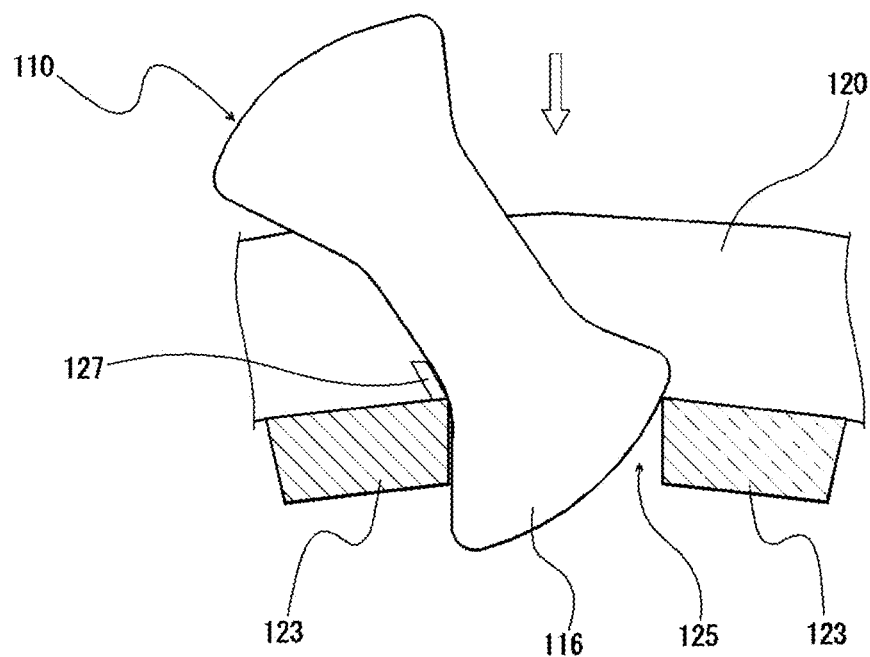
FIG. 8 is a partial cross-sectional view illustrating a configuration of the cage ring in still another example.

Specifically, when, e.g., the cam 110 is to be assembled in an inclined attitude obtained by rotating the cam 110 in the disengagement direction to the pocket portion 125 from the leg portion 116 side thereof, as illustrated in FIG. 8, one side edge of the outer surface of the rib 123 is provided with a plate-like guide member inclined with respect to the opening direction of the pocket portion 125 to extend to form a cam-insertion-attitude stabilizing portion 127. Needless to say, a position where the guide member is to be provided can appropriately be changed depending on a direction in which the cam 110 is assembled.

Alternatively, it may also be possible to use a configuration in which, in the cage ring 120 having a configuration illustrated in FIG. 8, the cam insertion guide portion is provided at a side edge of the rib 123 opposite to the side edge provided with the guide member.

While the embodiment of the present invention has been described heretofore in detail, the present invention is not limited to the foregoing embodiment, and the cam clutch unit according to the present invention may also be configured such that, e.g., in the cam clutch unit 100 illustrated in FIG. 1, to ensure coaxiality of the inner race and the outer race, some of the plurality of cams 110 are replaced with freely rotating rollers. A description will be given below of a cam clutch unit having such a configuration according to a second embodiment of the present invention.

Figure 9:
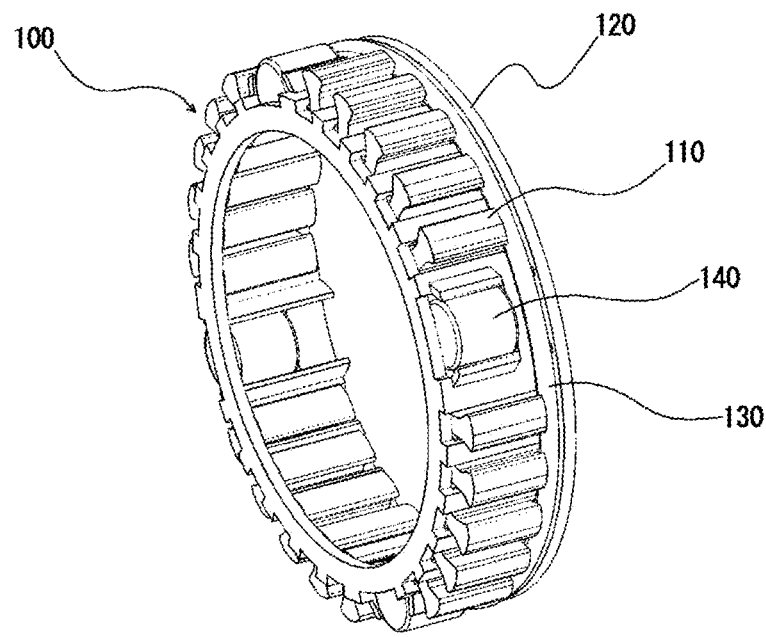
FIG. 9 is a perspective view illustrating a configuration of a cam clutch unit according to a second embodiment of the present invention.
Figure 10:
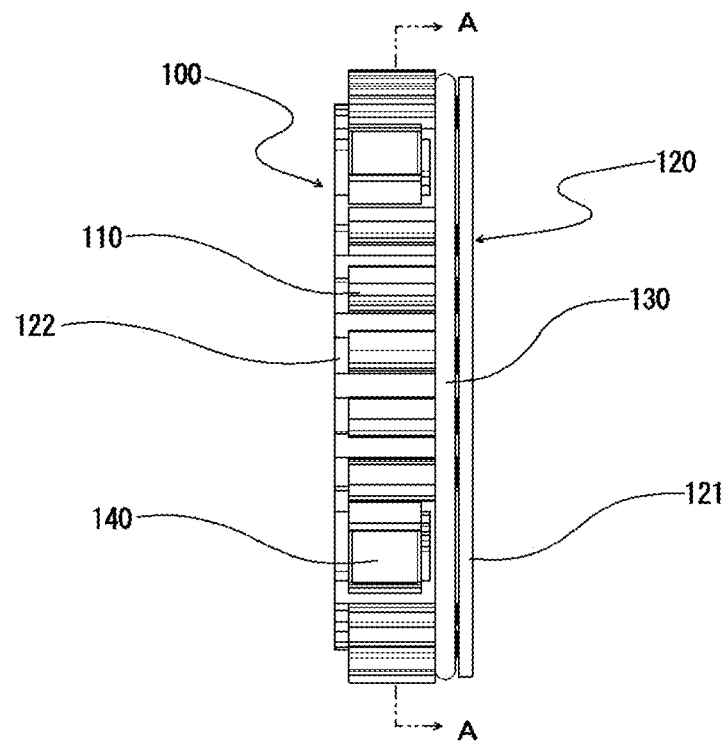
FIG. 10 is a side view of the cam clutch unit illustrated in FIG. 9.

As illustrated in FIGS. 9 and 10, the cam clutch unit 100 according the second embodiment of the present invention includes a plurality of rollers 140 which are arranged together with the plurality of cams 110 in an annular space between respective raceway surfaces of an inner race and an outer race that are coaxially provided to be capable of relative rotation with respect to each other. The respective numbers of the cams 110 and the rollers 140 and an arrangement thereof may be any.

Figure 11:
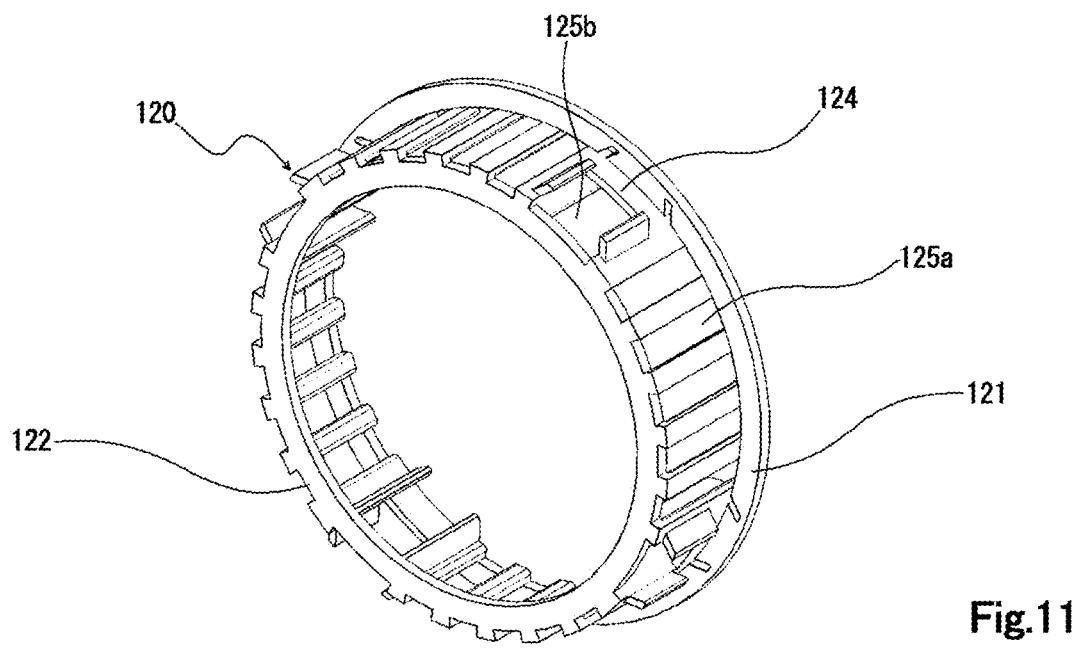
FIG. 11 is a perspective view illustrating a configuration of a cage ring in the cam clutch unit illustrated in FIG. 9.

As illustrated in FIG. 11, the cage ring 120 has cam pocket portions 125a that restrict relative movement of the cams 110 in a circumferential direction and roller pocket portions 125b that contain the rollers 140 to restrict relative movement of the rollers 140 in the circumferential direction.

Figure 12A:
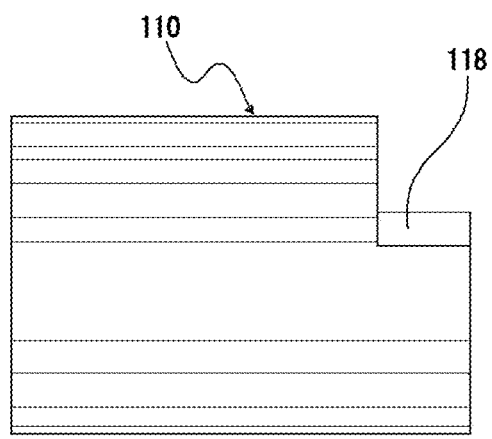
FIGS. 12A and 12B are a side view and an end surface view each illustrating a configuration of each of cams in the cam clutch unit illustrated in FIG. 9.
Figure 12B:
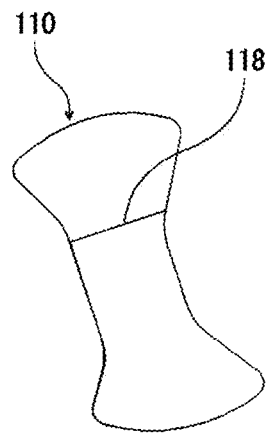

As illustrated in FIGS. 12A and 12B, each of the plurality of cams 110 has the same configuration as that of each of the cams 110 in the cam clutch unit 100 according to the first embodiment described above except that the cam 110 has, in one end surface thereof in an axial direction, a biasing-member-engaging stepped portion 118 that can be engaged with an annular spring serving as the biasing member 130.

In the present embodiment, the biasing-member-engaging stepped portion 118 is formed so as to be inclined from one side surface of the cam 110 to another side surface thereof toward an inner circumferential side in a radial direction. As a result of mounting of the biasing member 130, a one side portion of the mounting groove 113 is pressed toward the inner circumferential side to rotate the cam 110 in an engagement direction (clockwise direction in FIG. 12B) and bias the cam 110 into a state where the cam 110 is in contact with the inner race and the outer race.

Each of the both end surfaces of the cam 110 in the axial direction is flat-shaped to allow the cam 110 to approach the cam pocket portion 125a, while being in an attitude in which the both end surfaces extend in the opening direction (radial direction) of the pocket portion 125 without being inclined in the axial direction during assembly.

Figure 13:
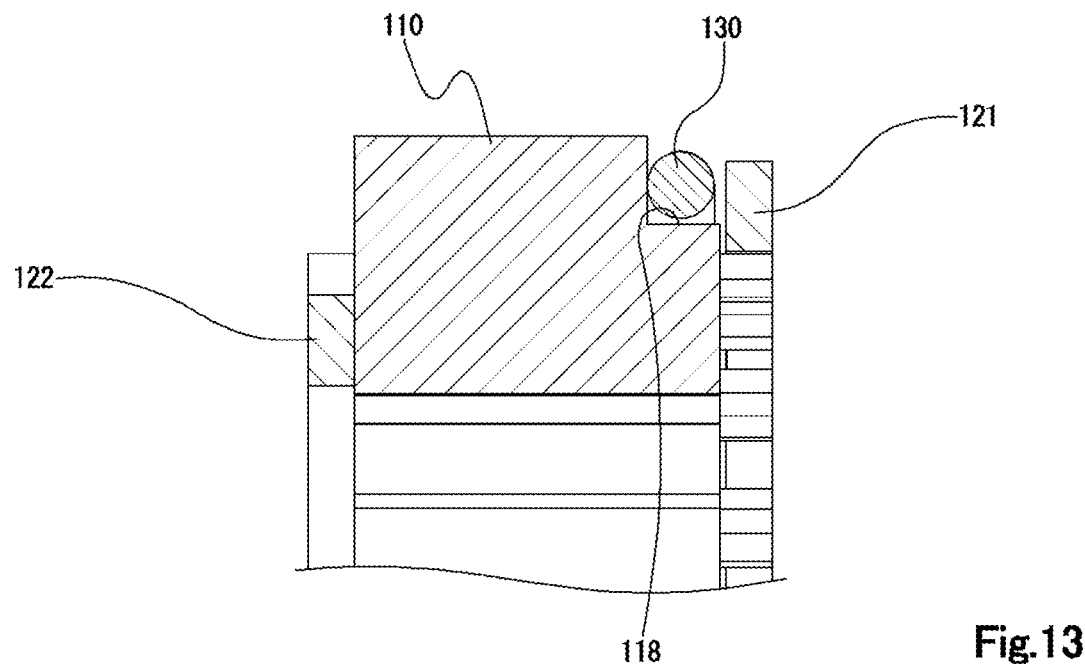
FIG. 13 is a partial cross-sectional view along a rotation axis, which schematically illustrates the configuration of the cam clutch unit illustrated in FIG. 9.

In a state where the cam 110 is placed in the cam pocket portion 125a, a position of the cam 110 in the circumferential direction is restricted by the rib 123 while, as illustrated in FIG. 13, a position of the cam 110 in the axial direction is restricted by the one-end-side annular plate 121 and the another-end-side annular plate 122 that are included in the flange portion.

Each of the plurality of rollers 140 has a simple cylindrical or columnar shape having no groove or no stepped portion and, in the present embodiment, as illustrated in FIG. 10, a dimension of the roller 140 in the axial direction is equal to or less than a dimension of the cam 110 in the axial direction from which the biasing-member-engaging stepped portion 118 is excluded.

In the present embodiment, outer circumferential edge portions of both end surfaces of the roller 140 are chamfered to prevent engagement with the biasing member 130.

Figure 14:
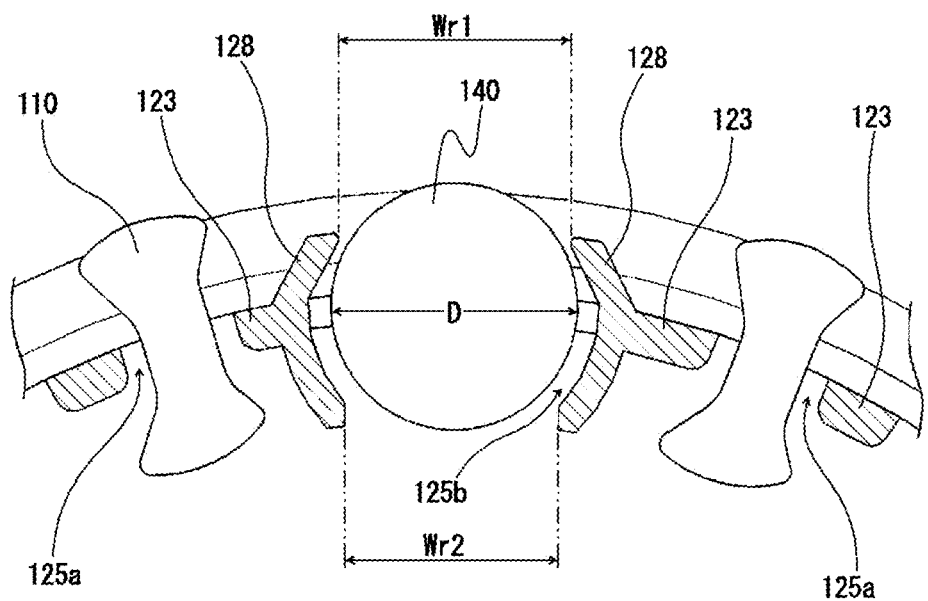
FIG. 14 is a partial cross-sectional view illustrating a portion of a cross section along a line A-A in FIG. 10.

The roller pocket portion 125b of the cage ring 120 has a surface thereof adjacent to the roller 140 in the circumferential direction which is formed into a shape that restricts movement of the roller 140 toward the outer race side and the inner race side. In the present embodiment, as illustrated in FIG. 14, the roller pocket portion 125b is configured by providing respective side surfaces of the two ribs 123 defining the roller pocket portion 125b which are opposed to each other with a pair of restricting portions 128 forming a columnar space capable of containing the roller 140. The restricting portions 128 are configured such that each of a separation distance Wr1 between outer-circumferential-side end edges thereof and a separation distance Wr2 between inner-circumferential-side end edges thereof is smaller than a roller diameter D and, by being elastically deformed as the roller 140 is inserted therebetween, the restricting portions 128 allow the roller 140 to be placed in the roller pocket portion 125b.

In addition, as illustrated in FIG. 11, the roller pocket portion 125b is configured such that a dimension thereof in the axial direction is smaller than a dimension of the cam pocket portion 125a in the axial direction, and has a restricting wall portion 124 protruding from one surface of the one-end-side annular plate 121 toward another end side thereof in the axial direction. Thus, movement of the roller 140 in the axial direction is restricted by the another-end-side annular plate 122 and the restricting wall portion 124.

As illustrated in FIG. 13, the annular spring serving as the biasing member 130 is mounted on the biasing-member-engaging stepped portion 118, while having a gap between one end surface (end surface of a portion of the cam 110 from which the basing-member-engaging stepped portion 118 is excluded) of the cam 110 and an end surface of the one-end-side annular plate 121 included in the flange portion. As a result, the biasing member 130 is no longer held between the cam 110 and the cage ring 120, and therefore the biasing member 130 is not damaged when the cam clutch unit 100 is inserted between the inner race and the outer race.

In the cam clutch unit 100 according to the present embodiment, the cam 110 and the cam pocket portion 125a as well as the roller 140 and the roller pocket portion 125b are configured to be snap-fitted with each other, and therefore it is possible to easily assemble the cam 110 and the roller 140 without damaging the cage ring 120, while it is also possible to prevent the cam 110 and the roller 140 from falling off.

In addition, there is no need to separately provide the cam 110 and the cage ring 120 with respective structures that prevent the cam 110 from falling off, and a roller having a simple columnar or cylindrical shape that requires no processing can be used as the roller 140, which allows a reduction in processing burden.

While the embodiments of the present invention have been described heretofore in detail, the present invention is not limited to the embodiments described above, and various design changes can be made without departing from the present invention described in the scope of claims.

For example, in each of the embodiments described above, the description has been given of the cam 110 having the head portion 111 and the leg portion 116 that are configured such that each of the first-inclination-direction width W1, the second-inclination-direction width W2, the third-inclination-direction width W3, and the fourth-inclination-direction width W4 is larger than the opening width Wp of the pocket portion 125 but, in a case where the cam is to be assembled to the cage ring in a state where the biasing member is mounted, it may also be possible to configure the head portion and the leg portion of the cam such that an inclination-direction width in an inclined attitude in which the cam is inclined in a direction opposite to a direction in which the cam rotates as a result of mounting of the biasing member in the cam is smaller than the opening width of the pocket portion.

While the description has been given of the configuration using the annular spring as the biasing member, the biasing member may also be, e.g., a ribbon spring, a torsion spring, or the like. In addition, with regard to the cam clutch unit according to the second embodiment, in the embodiment described above, the biasing-member-engaging stepped portion is provided only in one end surface of the cam in the axial direction, but it may also be possible to provide the biasing-member-engaging stepped portion in each of the both end surfaces of the cam in the axial direction and bias the cam with the two annular springs.

What is claimed is:

1. A cam clutch unit comprising a plurality of cams arranged between an inner race and an outer race that are coaxially provided to be capable of relative rotation with respect to each other, a cage ring made of a resin and having a plurality of pocket portions that restrict relative movement of the cams in a circumferential direction, and a biasing member that biases the cams so as to bring the cams into contact with the inner race and the outer race, each of the cams being configured to have a body portion placed in the pocket portion while being inserted therethrough, and have a head portion continued to an outer circumferential side of the body portion, and moreover have a leg portion continued to an inner circumferential side of the body portion, with a dimension in an axial direction being smaller than a dimension of the pocket portion in the axial direction, each of the head portion and the leg portion being configured such that a maximum cross-sectional width thereof corresponding to a maximum distance between two parallel lines, when each of the head portion and the leg portion is held between the two parallel lines, is larger than an opening width of the pocket portion in a cross section perpendicular to a rotation center of the cam, at least one of the head portion and the leg portion being configured to be allowed to pass through the pocket portion by rotating the cam while inserting the cam, which is in an inclined attitude, into the pocket portion along an opening direction of the pocket portion and thereby elastically deforming the pocket portion.

2. The cam clutch unit according to claim 1, wherein, in the cross section perpendicular to the rotation center of the cam, the cam has:

a first-inclination-direction width W1 corresponding to a minimum distance between two straight lines, which are a first virtual straight line L1 connecting any two points, the closest distance between which, in a head-portion-side region over one side surface of the cam, has the same dimension as that of a thickness of the pocket portion and a straight line parallel to the first virtual straight line L1, when another side portion of the head portion is held between the two straight lines;

a second-inclination-direction width W2 corresponding to a minimum distance between two straight lines, which are a second virtual straight line L2 connecting any two points, the closest distance between which, in a head-portion-side region over another side surface of the cam, has the same dimension as that of the thickness of the pocket portion and a straight line parallel to the second virtual straight line L2, when one side portion of the head portion is held between the two straight lines;

a third-inclination-direction width W3 corresponding to a minimum distance between two straight lines, which are a third virtual straight line L3 connecting any two points, the closest distance between which, in a leg-portion-side region over the one side surface of the cam, has the same dimension as that of the thickness of the pocket portion and a straight line parallel to the third virtual straight line L3, when another side portion of the leg portion is held between the two straight lines; and a fourth-inclination-direction width W4 corresponding to a minimum distance between two straight lines, which are a fourth virtual straight line L4 connecting any two points, the closest distance between which, in a leg-portion-side region over the other side surface of the cam, has the same dimension as that of the thickness of the pocket portion and a straight line parallel to the fourth virtual straight line L4, when one side portion of the leg portion is held between the two straight lines, and at least one of the first-inclination-direction width W1, the second-inclination-direction width W2, the third-inclination-direction width W3, and the fourth-inclination-direction width W4 has a dimension that allows the pocket portion to be elastically deformed as the cam is inserted into the pocket portion.

3. The cam clutch unit according to claim 1, wherein the cage ring has a cam insertion guide portion at least on one side of an opening edge of the pocket portion in the circumferential direction.

4. The cam clutch unit according to claim 1, wherein the cage ring has, at an opening edge portion of the pocket portion, a cam-insertion-attitude stabilizing portion that comes into contact with one side surface or another side surface of the body portion when the cam is placed in an inclined attitude upon insertion of the cam into the pocket portion.

5. The cam clutch unit according to claim 1, wherein
the cam has a biasing-member-engaging stepped portion in one end surface thereof in the axial direction,
the cage ring has, at one end portion thereof in the axial direction, a radially outwardly protruding flange portion around an entire circumference in the circumferential direction, and
the biasing member is formed of an annular spring to be mounted on the biasing-member-engaging stepped portion in a state where a gap is formed between the one end surface of the cam and an end surface of the flange portion.

6. The cam clutch unit according to claim 1, further comprising:
a plurality of rollers arranged between the inner race and the outer race, wherein
the cage ring has a roller holding pocket portion having a surface thereof adjacent to each of the rollers in the circumferential direction, the roller holding pocket portion being formed into a shape that restricts movement of the roller toward the outer race side and the inner race side, and
the roller holding pocket portion is configured to be elastically deformed as the roller is inserted into the roller holding pocket portion along an opening direction of the roller holding pocket portion to allow the roller to be placed in the roller holding pocket portion.

* * * * *